(12) United States Patent
Shimura (10) Patent No.: US 8,320,867 B2
(45) Date of Patent: Nov. 27, 2012

(54) GAIN IN BALANCE MEASURING APPARATUS, PHASE DIFFERENCE CORRESPONDING VALUE MEASURING APPARATUS, METHOD, PROGRAM, AND RECORDING MEDIUM

(75) Inventor: Takashi Shimura, Tochigi (JP)

(73) Assignee: Advantest Corporation, Tokyo (JP)

( * ) Notice: Subject to any disclaimer, the term of this patent is extended or adjusted under 35 U.S.C. 154(b) by 729 days.

(21) Appl. No.: 12/352,037

(22) Filed: Jan. 12, 2009

(65) Prior Publication Data

US 2009/0209218 A1    Aug. 20, 2009

(30) Foreign Application Priority Data

Feb. 8, 2008    (JP) ................. 2008-029504

(51) Int. Cl.
*H04B 1/10*    (2006.01)

(52) U.S. Cl. .............. 455/296; 455/226.1; 455/67.14; 375/324; 375/329; 375/345; 375/346; 375/343; 375/285; 375/322; 375/326; 375/260

(58) Field of Classification Search ............. 375/324, 375/329, 345, 346, 343, 285, 322, 326, 260; 455/226.1, 67.14, 296

See application file for complete search history.

(56) References Cited

U.S. PATENT DOCUMENTS

| 7,310,388 | B2 * | 12/2007 | Koskela et al. | ......... 375/329 |
| 7,356,103 | B2 | 4/2008 | Nishikawa | |
| 2005/0147190 | A1 * | 7/2005 | Nishikawa | ......... 375/343 |
| 2006/0039506 | A1 * | 2/2006 | D'Alessandro | ......... 375/324 |
| 2006/0056546 | A1 | 3/2006 | Hayase et al. | |

FOREIGN PATENT DOCUMENTS

| JP | 2005-197968 | 7/2005 |
| JP | 2006-81045 A | 3/2006 |

OTHER PUBLICATIONS

English language Abstract and translation of JP 2006-81045 A (Mar. 23, 2006).
Razavi, "Design Considerations for Direct-Conversion Receivers," IEEE Transactions on Circuits and Systems II: Analog and Digital Signal Processing, vol. 44, No. 6, Jun. 1997, pp. 428-435.
Japan Office Action in JP 2008-029504, mail date is May 7, 2012.

* cited by examiner

*Primary Examiner* — Junpeng Chen
(74) *Attorney, Agent, or Firm* — Greenblum & Bernstein, P.L.C.

(57) ABSTRACT

An object of the present invention is to increase measurement precision for measuring errors of a quadrature demodulator. An error measurement device 10 receives an I signal and a Q signal from a quadrature demodulator 4 for demodulating a signal to be demodulated including multiple carrier signals respectively different from each other in frequency, and measures a gain imbalance which is a ratio of the amplitude of the Q signal to the amplitude of the I signal. Further, the error measurement device 10 includes an I-signal amplitude deriving unit 14I which derives the amplitude of the I signal for the respective carrier signals, a Q-signal amplitude deriving unit 14Q which derives the amplitude of the Q signal for the respective carrier signals, a carrier amplitude ratio deriving unit 16a which derives a ratio of the amplitude of the Q signal to the amplitude of the I signal for the respective carrier signals based on the results derived by the I-signal amplitude deriving unit 14I and the Q-signal amplitude deriving unit 14Q, and an averaging unit 18a which derives the gain imbalance GB by averaging the results derived by the carrier amplitude ratio deriving unit 16a.

17 Claims, 5 Drawing Sheets

GAIN IN BALANCE MEASURING APPARATUS, PHASE DIFFERENCE CORRESPONDING VALUE MEASURING APPARATUS, METHOD, PROGRAM, AND RECORDING MEDIUM

FIELD OF THE INVENTION

The present invention relates to a measurement of errors of a quadrature demodulator.

RELATED ART

Conventionally, it has been known that errors of the quadrature demodulator include a gain imbalance and a quadrature error. A method for measuring the quadrature error is described in Patent Document 1 and Non-Patent Document 1, for example.

(Patent Document 1) Japanese Laid-Open Patent Publication No. 2006-81045

(Non-Patent Document 1) Behzad Razavi, "Design Considerations for Direct-Conversion Receivers", IEEE Transaction on Circuits and Systems II, vol. 44, no. 6, pp. 428-435, 1997

It is therefore an object of the present invention to increase measurement precision for measuring the error of the quadrature demodulator.

SUMMARY OF THE INVENTION

According to the present invention, a gain imbalance measurement device which receives an I signal and a Q signal from a quadrature demodulator for demodulating a signal to be demodulated including a plurality of carrier signals respectively different from each other in frequency, and measures a gain imbalance which is a ratio between the amplitude of the I signal and the amplitude of the Q signal, includes: an I-signal amplitude deriving unit that derives the amplitude of the I signal for the respective carrier signals; a Q-signal amplitude deriving unit that derives the amplitude of the Q signal for the respective carrier signals; a carrier amplitude ratio deriving unit that derives a ratio between the amplitude of the I signal and the amplitude of the Q signal for the respective carrier signals based on the results derived by the I-signal amplitude deriving unit and the Q-signal amplitude deriving unit; and a gain imbalance deriving unit that derives the gain imbalance based on the results derived by the carrier amplitude ratio deriving unit.

According to the present invention, a gain imbalance measurement device which receives an I signal and a Q signal from a quadrature demodulator for demodulating a signal to be demodulated including a plurality of carrier signals respectively different from each other in frequency, and measures a gain imbalance which is a ratio between the amplitude of the I signal and the amplitude of the Q signal, can be provided.

An I-signal amplitude deriving unit derives the amplitude of the I signal for the respective carrier signals. A Q-signal amplitude deriving unit derives the amplitude of the Q signal for the respective carrier signals. A carrier amplitude ratio deriving unit derives a ratio between the amplitude of the I signal and the amplitude of the Q signal for the respective carrier signals based on the results derived by the I-signal amplitude deriving unit and the Q-signal amplitude deriving unit. A gain imbalance deriving unit derives the gain imbalance based on the results derived by the carrier amplitude ratio deriving unit.

According to the gain imbalance measurement device of the present invention, the gain imbalance deriving unit may obtain the gain imbalance by averaging the results derived by the carrier amplitude ratio deriving unit.

According to the present invention, the gain imbalance measurement device may include: an I-signal FFT unit that transforms the I signal by the FFT, thereby obtaining a component of the I signal for the respective carrier signals, and feeds the component to the I-signal amplitude deriving unit; and a Q-signal FFT unit that transforms the Q signal by the FFT, thereby obtaining a component of the Q signal for the respective carrier signals, and feeds the component to the Q-signal amplitude deriving unit.

According to the gain imbalance measurement device of the present invention, the quadrature demodulator may include: a local signal source that outputs a local signal, and a multiplier that multiplies the signal to be demodulated by the local signal or an orthogonal local signal orthogonal in phase to the local signal; and the frequencies of all the carrier signals are higher than the frequency of the local signal or lower than the frequency of the local signal.

According to the gain imbalance measurement device of the present invention, an interval between arbitrary one of the carrier signals and an adjacent carrier signal which is one of the carrier signals and is adjacent to the arbitrary carrier signal may be set such that a first phase noise generated at a frequency adjacent to the frequency of an arbitrary component which is a component of the I signal and the Q signal corresponding to the arbitrary carrier signal is smaller than a second phase noise generated at a frequency adjacent to the frequency of an adjacent component which is a component of the I signal and the Q signal corresponding to the adjacent carrier signal at the frequency adjacent to the frequency of the adjacent component.

According to the present invention, a phase-difference correspondence value measurement device which receives an I signal and a Q signal from a quadrature demodulator for demodulating a signal to be demodulated including a plurality of carrier signals respectively different from each other in frequency, and measures a phase-difference correspondence value which corresponds to a difference between the phase of the I signal and the phase of the Q signal, includes: an I-signal phase deriving unit that derives the phase of the I signal for the respective carrier signals; a Q-signal phase deriving unit that derives the phase of the Q signal for the respective carrier signals; a carrier phase-difference corresponding value deriving unit that derives a carrier phase-difference corresponding value corresponding to a difference between the phase of the I signal and the phase of the Q signal for the respective carrier signals based on the results derived by the I-signal phase deriving unit and the Q-signal phase deriving unit; and a phase-difference corresponding value deriving unit that derives the phase-difference corresponding value based on the results derived by the carrier phase-difference corresponding value deriving unit.

According to the present invention, a phase-difference correspondence value measurement device which receives an I signal and a Q signal from a quadrature demodulator for demodulating a signal to be demodulated including a plurality of carrier signals respectively different from each other in frequency, and measures a phase-difference correspondence value which corresponds to a difference between the phase of the I signal and the phase of the Q signal, can be provided.

An I-signal phase deriving unit derives the phase of the I signal for the respective carrier signals. A Q-signal phase deriving unit derives the phase of the Q signal for the respective carrier signals. A carrier phase-difference corresponding value deriving unit derives a carrier phase-difference corresponding value corresponding to a difference between the phase of the I signal and the phase of the Q signal for the respective carrier signals based on the results derived by the I-signal phase deriving unit and the Q-signal phase deriving unit. A phase-difference corresponding value deriving unit derives the phase-difference corresponding value based on the results derived by the carrier phase-difference corresponding value deriving unit.

According to the phase-difference corresponding value measurement device of the present invention, the phase-difference corresponding value deriving unit may obtain the phase-difference corresponding value by averaging the results derived by the carrier phase-difference corresponding value deriving unit.

According to the present invention, the phase-difference corresponding value measurement device may include: an I-signal FFT unit that transforms the I signal by the FFT, thereby obtaining a component of the I signal for the respective carrier signals, and feeds the component to the I-signal phase deriving unit; and a Q-signal FFT unit that transforms the Q signal by the FFT, thereby obtaining a component of the Q signal for the respective carrier signals, and feeds the component to the Q-signal phase deriving unit.

According to the phase-difference corresponding value measurement device of the present invention, the quadrature demodulator may include: a local signal source that outputs a local signal, and a multiplier that multiplies the signal to be demodulated by the local signal or an orthogonal local signal orthogonal in phase to the local signal; and the frequencies of all the carrier signals are higher than the frequency of the local signal or lower than the frequency of the local signal.

According to the phase-difference corresponding value measurement device of the present invention, an interval between arbitrary one of the carrier signals and an adjacent carrier signal which is one of the carrier signals and is adjacent to the arbitrary carrier signal may be set such that a first phase noise generated at a frequency adjacent to the frequency of an arbitrary component which is a component of the I signal and the Q signal corresponding to the arbitrary carrier signal is smaller than a second phase noise generated at a frequency adjacent to the frequency of an adjacent component which is a component of the I signal and the Q signal corresponding to the adjacent carrier signal at the frequency adjacent to the frequency of the adjacent component.

According to the phase-difference corresponding value measurement device of the present invention, the phase-difference corresponding value may be a difference between the difference between the phase of the I signal and the phase of the Q signal, and 90 degrees; and the carrier phase-difference corresponding value may be a difference between the difference between the phase of the I signal and the phase of the Q signal, and 90 degrees for respective carrier signals.

According to the present invention, a gain imbalance measurement method of receiving an I signal and a Q signal from a quadrature demodulator for demodulating a signal to be demodulated including a plurality of carrier signals respectively different from each other in frequency, and measuring a gain imbalance which is a ratio between the amplitude of the I signal and the amplitude of the Q signal, includes: an I-signal amplitude deriving step that derives the amplitude of the I signal for the respective carrier signals; a Q-signal amplitude deriving step that derives the amplitude of the Q signal for the respective carrier signals; a carrier amplitude ratio deriving step that derives a ratio between the amplitude of the I signal and the amplitude of the Q signal for the respective carrier signals based on the results derived by the I-signal amplitude deriving step and the Q-signal amplitude deriving step; and a gain imbalance deriving step that derives the gain imbalance based on the results derived by the carrier amplitude ratio deriving step.

According to the present invention, a phase-difference correspondence value measurement method of receiving an I signal and a Q signal from a quadrature demodulator for demodulating a signal to be demodulated including a plurality of carrier signals respectively different from each other in frequency, and measuring a phase-difference correspondence value which corresponds to a difference between the phase of the I signal and the phase of the Q signal, includes: an I-signal phase deriving step that derives the phase of the I signal for the respective carrier signals; a Q-signal phase deriving step that derives the phase of the Q signal for the respective carrier signals; a carrier phase-difference corresponding value deriving step that derives a carrier phase-difference corresponding value corresponding to a difference between the phase of the I signal and the phase of the Q signal for the respective carrier signals based on the results derived by the I-signal phase deriving step and the Q-signal phase deriving step; and a phase-difference corresponding value deriving step that derives the phase-difference corresponding value based on the results derived by the carrier phase-difference corresponding value deriving step.

The present invention is a program of instructions for execution by the computer to perform a gain imbalance measurement process for receiving an I signal and a Q signal from a quadrature demodulator for demodulating a signal to be demodulated including a plurality of carrier signals respectively different from each other in frequency, and measuring a gain imbalance which is a ratio between the amplitude of the I signal and the amplitude of the Q signal, the gain imbalance measurement process including: an I-signal amplitude deriving step that derives the amplitude of the I signal for the respective carrier signals; a Q-signal amplitude deriving step that derives the amplitude of the Q signal for the respective carrier signals; a carrier amplitude ratio deriving step that derives a ratio between the amplitude of the I signal and the amplitude of the Q signal for the respective carrier signals based on the results derived by the I-signal amplitude deriving step and the Q-signal amplitude deriving step; and a gain imbalance deriving step that derives the gain imbalance based on the results derived by the carrier amplitude ratio deriving step.

The present invention is a program of instructions for execution by the computer to perform a phase-difference correspondence value measurement process for receiving an I signal and a Q signal from a quadrature demodulator for demodulating a signal to be demodulated including a plurality of carrier signals respectively different from each other in frequency, and measuring a phase-difference correspondence value which corresponds to a difference between the phase of the I signal and the phase of the Q signal, the phase-difference correspondence value measurement process including: an I-signal phase deriving step that derives the phase of the I signal for the respective carrier signals; a Q-signal phase deriving step that derives the phase of the Q signal for the respective carrier signals; a carrier phase-difference corresponding value deriving step that derives a carrier phase-difference corresponding value corresponding to a difference between the phase of the I signal and the phase of the Q signal for the respective carrier signals based on the results derived by the I-signal phase deriving step and the Q-signal phase deriving step; and a phase-difference corresponding value deriving step that derives the phase-difference corresponding value based on the results derived by the carrier phase-difference corresponding value deriving step.

The present invention is a computer-readable medium having a program of instructions for execution by the computer to perform a gain imbalance measurement process for receiving an I signal and a Q signal from a quadrature demodulator for demodulating a signal to be demodulated including a plurality of carrier signals respectively different from each other in frequency, and measuring a gain imbalance which is a ratio between the amplitude of the I signal and the amplitude of the Q signal, the gain imbalance measurement process including: an I-signal amplitude deriving step that derives the amplitude of the I signal for the respective carrier signals; a Q-signal amplitude deriving step that derives the amplitude of the Q signal for the respective carrier signals; a carrier amplitude ratio deriving step that derives a ratio between the amplitude of the I signal and the amplitude of the Q signal for the respective carrier signals based on the results derived by the I-signal amplitude deriving step and the Q-signal amplitude deriving step; and a gain imbalance deriving step that derives the gain imbalance based on the results derived by the carrier amplitude ratio deriving step.

The present invention is a computer-readable medium having a program of instructions for execution by the computer to perform a phase-difference correspondence value measurement process for receiving an I signal and a Q signal from a quadrature demodulator for demodulating a signal to be demodulated including a plurality of carrier signals respectively different from each other in frequency, and measuring a phase-difference correspondence value which corresponds to a difference between the phase of the I signal and the phase of the Q signal, the phase-difference correspondence value measurement process including: an I-signal phase deriving step that derives the phase of the I signal for the respective carrier signals; a Q-signal phase deriving step that derives the phase of the Q signal for the respective carrier signals; a carrier phase-difference corresponding value deriving step that derives a carrier phase-difference corresponding value corresponding to a difference between the phase of the I signal and the phase of the Q signal for the respective carrier signals based on the results derived by the I-signal phase deriving step and the Q-signal phase deriving step; and a phase-difference corresponding value deriving step that derives the phase-difference corresponding value based on the results derived by the carrier phase-difference corresponding value deriving step.

BEST MODE FOR CARRYING OUT THE INVENTION

A description will now be given of an embodiment of the present invention with reference to drawings.

Figure 1:
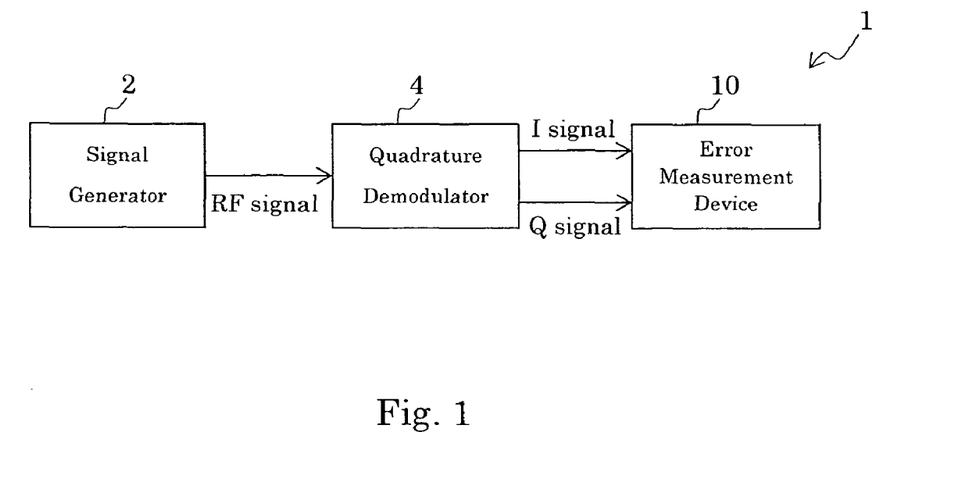
FIG. 1 is a functional block diagram showing a configuration of an error measurement system 1 according to an embodiment of the present invention.

FIG. 1 is a functional block diagram showing a configuration of an error measurement system 1 according to the embodiment of the present invention. The error measurement system 1 includes a signal generator 2, a quadrature demodulator 4, and an error measurement device 10.

The signal generator 2 generates a radio frequency (RF) signal. The RF signal (signal to be demodulated) includes multiple carrier signals. The frequencies of the respective carrier signals are different from each other. It should be noted that the RF signal is a signal to be demodulated by the quadrature demodulator 4.

FIGS. 2(a) and 2(b) show frequency spectra of the respective carrier signals contained in the RF signal. It should be noted that $f_c$ denotes the frequency of a local signal output from a local signal source 42 of the quadrature demodulator 4. Moreover, the horizontal axis of FIGS. 2(a) and 2(b) represents the frequency and the vertical axis of FIGS. 2(a) and 2(b) represents the power [dBm].

The frequencies of the respective carrier signals take two types of forms as shown in FIGS. 2(a) and 2(b).

First, as shown in FIG. 2(a), in one form, the frequencies $f_1$, $f_2$, ..., $f_N$ of all the carrier signals $C_1, C_2, ..., C_N$ (N is an integer greater than or equal to 2) are higher than the frequency $f_c$ of the local signal.

Moreover, as shown in FIG. 2(b), in the other form, the frequencies $f_1, f_2, ..., f_N$ of all the carrier signals are lower than the frequency $f_c$ of the local signal.

The reason for this limitation to the case in which the frequencies of all the carrier signals are lower or higher than $f_c$ in this way is that an I-signal FFT unit 12I and a Q-signal FFT unit 12Q of the error measurement device 10 carry out the FFT.

It is assumed that the frequencies $f_a$ and $f_b$ of two carrier signals satisfy relationships: $f_a < f_c < f_b$, and $(f_a+f_b)/2=f_c$. In this case, when the I signal and the Q signal output from the quadrature demodulator 4 are transformed by the FFT, an $f_a$ component and an $f_b$ component, which are results of the FFT, overlap each other, and are indistinguishable from each other.

If the frequencies of all the carrier signals are higher or lower than the frequency $f_c$, the relationship $(f_a+f_b)/2=f_c$ does not hold, and it is thus possible to prevent the $f_a$ component and the $f_b$ component, which are results of the FFT, from overlapping each other.

It should be noted that the frequencies of all the carrier signals are higher than the frequency $f_c$ according to the embodiment of the present invention (refer to FIG. 2(a)).

Figure 3:
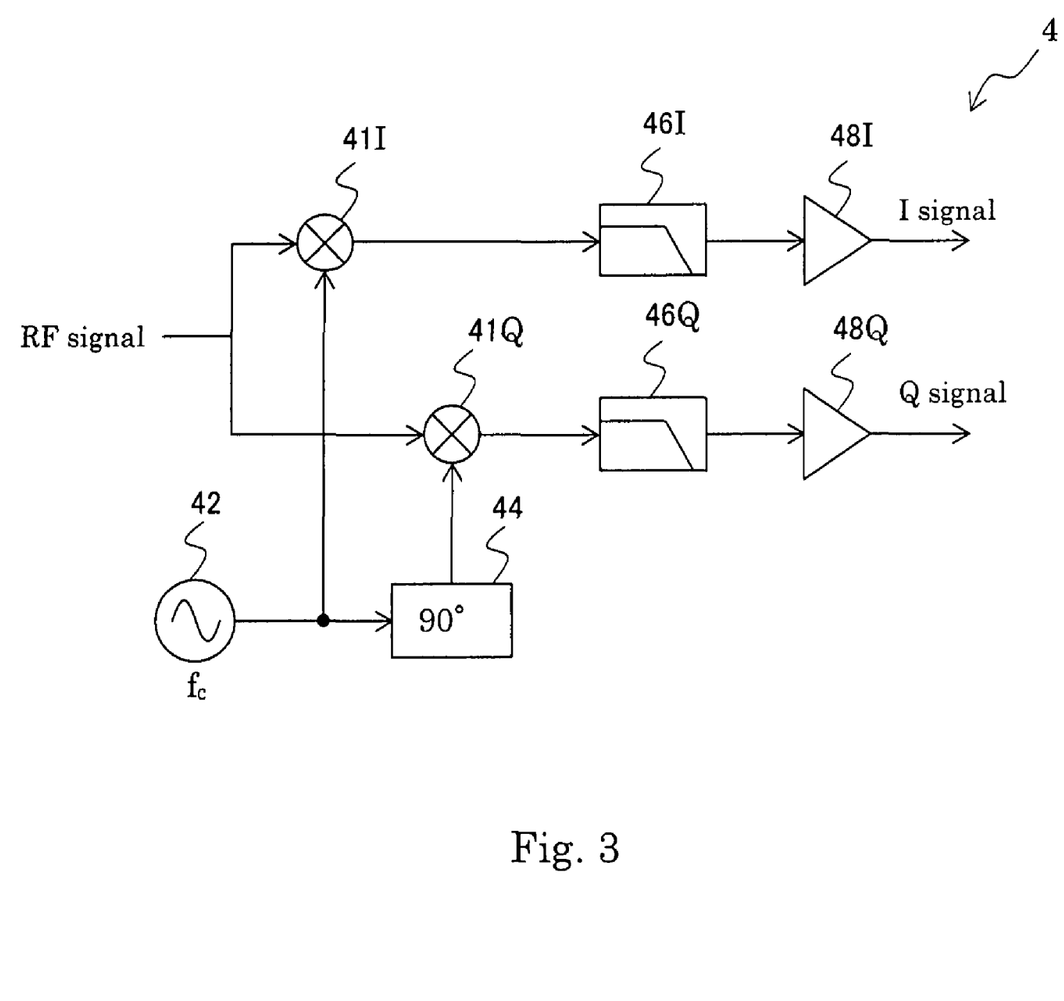
FIG. 3 is a functional block diagram showing a configuration of the quadrature demodulator 4.

FIG. 3 is a functional block diagram showing a configuration of the quadrature demodulator 4. The quadrature demodulator 4 includes multipliers 41I and 41Q, a local signal source 42, a phase shifter 44, low-pass filters 46I and 46Q, and amplifiers 48I and 48Q. The quadrature demodulator 4 demodulates the RF signal (signal to be demodulated).

The local signal source 42 outputs a local signal (frequency $f_c$).

The multiplier 41I multiplies the local signal and the RF signal by each other.

The phase shifter 44 receives the local signal from the local signal source 42, delays the phase of the local signal by 90 degrees, and outputs the resulting signal. The signal orthogonal in phase to the local signal is referred to as orthogonal local signal. The phase shifter 44 outputs the orthogonal local signal.

The multiplier 41Q multiples the orthogonal local signal output from the phase shifter 44 and the RF signal by each other.

The low-pass filter 46I passes a low-frequency component of an output from the multiplier 41I, thereby extracting a baseband component from the output of the multiplier 41I.

The low-pass filter 46Q passes a low-frequency component of an output from the multiplier 41Q, thereby extracting a baseband component from the output of the multiplier 41Q.

The amplifier 48I amplifies an output of the low-pass filter 46I. An output of the amplifier 48I is the I signal.

The amplifier 48Q amplifies an output of the low-pass filter 46Q. An output of the amplifier 48Q is the Q signal.

It is ideal that the amplitude of the I signal and the amplitude of the Q signal are equal to each other. However, in practice, a gain along the multiplier 41I, the low-pass filter 46I, and the amplifier 48I (referred to as "I path") and a gain along the multiplier 41Q, the low-pass filter 46Q, and the amplifier 48Q (referred to as "Q path") are different from each other. This is caused by variations in characteristics of the I path and the Q path. Thus, there can actually occur a case in which the amplitude of the I signal and the amplitude of the Q signal are not equal to each other.

On this occasion, a ratio between the amplitude of the I signal and the amplitude of the Q signal is referred to as gain imbalance.

Moreover, it is ideal that a difference between the phase of the I signal and the phase of the Q signal is 90 degrees. However, the difference between the phase of the I signal and the phase of the Q signal takes a value different from 90 degrees due to variations in characteristics of the phase shifter 44 and the like.

On this occasion, a difference between the difference between the phase of the I signal and the phase of the Q signal, and 90 degrees is referred to as a quadrature error.

It should be noted that the local signal contains noise. When the local signal (orthogonal local signal) is multiplied by the RF signal, the result of the multiplication contains noise. The result of the multiplication passes through the low-pass filter 46I (46Q) and the amplifier 48I (48Q), and results in the I signal (Q signal). Thus, the I signal and the Q signal contain the noise resulting from the noise contained in the local signal. This noise contained in the I signal and the Q signal (caused by the noise contained in the local signal) is referred to as phase noise. The phase noise causes a decrease in the precision of measurement of the gain imbalance and the quadrature error carried out by the error measurement device 10.

FIG. 4(a) shows a frequency spectrum of one arbitrary carrier signal (arbitrary carrier signal) $C_{m-1}$ and an adjacent carrier signal $C_m$ adjacent to the arbitrary carrier signal $C_{m-1}$, and FIG. 4(b) shows a frequency spectrum of an arbitrary component $C'_{m-1}$ (of the I signal and Q signal) corresponding to the arbitrary carrier signal $C_{m-1}$, a first phase noise $PN_{m-1}$ generated in a neighborhood thereof, an adjacent component $C'_m$ (of the I signal and Q signal) corresponding to the adjacent carrier signal $C_m$, and a second phase noise $PN_m$ generated in a neighborhood thereof. It should be noted that m is an integer from 2 to N. Moreover, the horizontal axis of FIGS. 4(a) and 4(b) represents the frequency and the vertical axis of FIGS. 4(a) and 4(b) represents the power [dBm].

FIG. 4(a) corresponds to a partially enlarged view of FIG. 2(a). The frequency of the arbitrary carrier signal $C_{m-1}$ is $f_{m-1}$, and the frequency of the adjacent carrier signal $C_m$ is $f_m$.

When the RF signal is demodulated by the quadrature demodulator 4, the arbitrary carrier signal $C_{m-1}$ and the adjacent carrier signal $C_m$ are also demodulated by the quadrature demodulator 4.

Referring to FIG. 4(b), the signal obtained by demodulating the arbitrary carrier signal $C_{m-1}$ is a component of the I signal and the Q signal, which is referred to as arbitrary component $C'_{m-1}$. The signal obtained by demodulating the adjacent carrier signal $C_m$ is a component of the I signal and the Q signal, which is referred to as adjacent component $C'_m$. The frequency of the arbitrary component $C'_{m-1}$ is $f_{m-1}-f_c$, and the frequency of the adjacent component $C'_m$ is $f_m-f_c$. Thus the interval ($f_m-f_{m-1}$) between the arbitrary carrier signal $C_{m-1}$ and the adjacent carrier signal $C_m$ is equal to the interval ($f_m-f_{m-1}$) between the arbitrary component $C'_{m-1}$ and the adjacent component $C'_m$.

The power of the first phase noise $PN_{m-1}$ is approximately constant in a neighborhood of the arbitrary component $C'_{m-1}$, namely, in a neighborhood of the frequency $f_{m-1}-f_c$ of the arbitrary component $C'_{m-1}$ ranging from $f_{m-1}"$ to $f_{m-1}'$ ($f_{m-1}"<f_{m-1}-f_c<f_{m-1}'$). The first phase noise $PN_{m-1}$ attenuates beyond the range of the neighborhood of the arbitrary component $C'_{m-1}$.

The power of the second phase noise $PN_m$ is approximately constant in a neighborhood of the adjacent component $C'_m$, namely, in a neighborhood of the frequency $f_m-f_c$ of the adjacent component $C'_m$ ranging from $f_m"$ to $f_m'$ ($f_m"<f_m-f_c<f_m'$). The second phase noise $PN_m$ attenuates beyond the range of the neighborhood of the adjacent component $C'_m$.

The interval $f_m-f_{m-1}$ between the arbitrary carrier signal $C_{m-1}$ and the adjacent carrier signal $C_m$ is set to be sufficiently wide. In other words, the interval $f_m-f_{m-1}$ is set such that the first phase noise $PN_{m-1}$ is smaller than the second phase noise $PN_m$ in the neighborhood of the adjacent component $C'_m$ ranging from $f_m"$ to $f_m'$.

For example, as shown in FIG. 4(b), when the interval $f_m-f_{m-1}$ is set such that the neighborhood of the arbitrary component $C'_{m-1}$ and the neighborhood of the adjacent component $C'_m$ do not overlap each other ($f_{m-1}'<f_m"$), the first phase noise $PN_{m-1}$ is smaller than the second phase noise $PN_m$ in the neighborhood of the adjacent component $C'_m$ ranging from $f_m"$ to $f_m'$.

As a result, it is possible to significantly restrain a level of the first phase noise $PN_{m-1}$ superimposing on the adjacent component $C'_m$.

It should be noted that the interval $f_m-f_{m-1}$ may be equal for any m.

The error measurement device (a gain imbalance measurement device and a phase-difference corresponding value measurement device) 10 receives the I signal and the Q signal, thereby measuring the gain imbalance. Moreover, the error measurement device 10 measures a phase-difference corresponding value corresponding to the difference between the phase of the I signal and the phase of the Q signal (specifically, the quadrature error).

Figure 5:
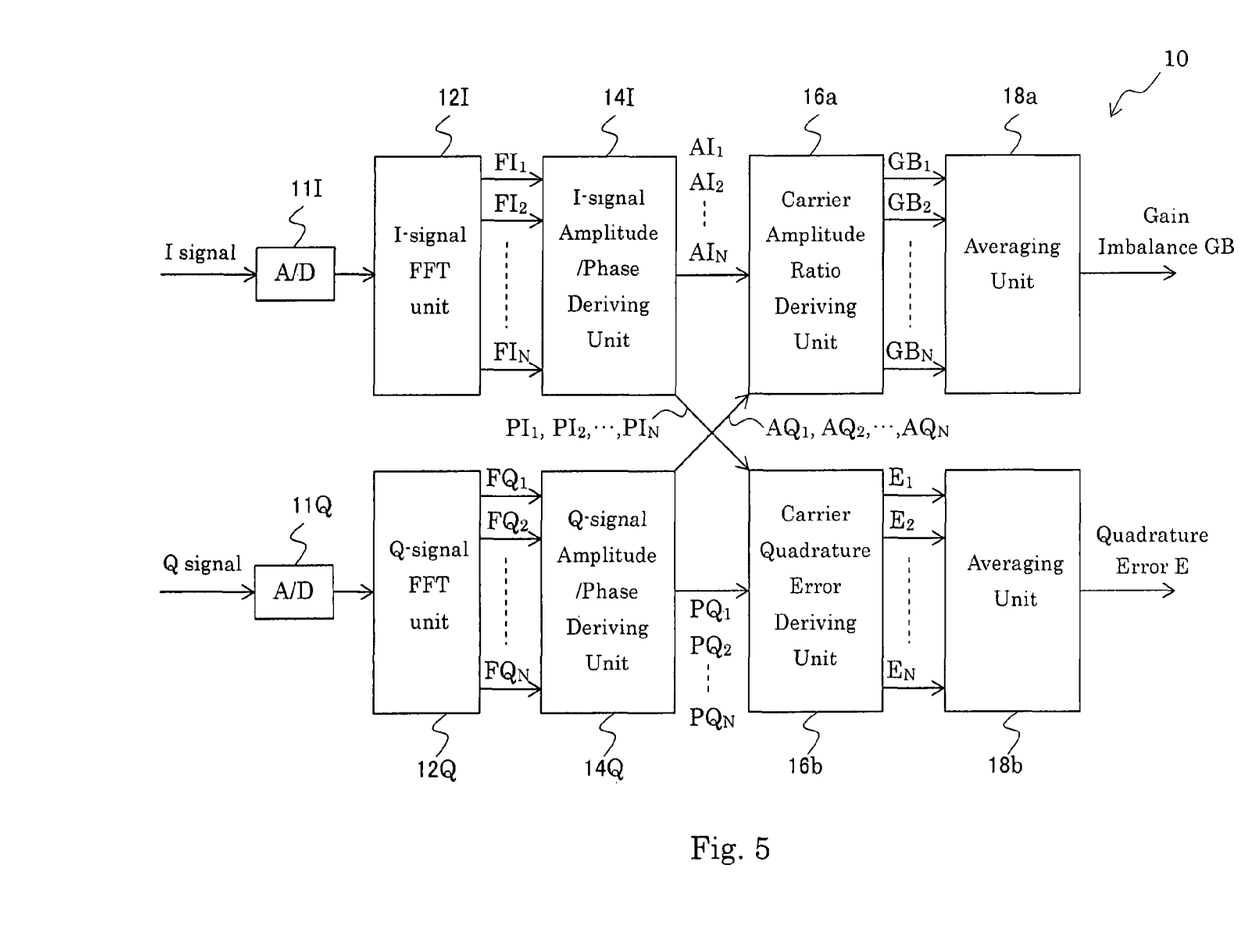
FIG. 5 is a functional block diagram showing a configuration of the error measurement device 10.

FIG. 5 is a functional block diagram showing a configuration of the error measurement device 10. The error measurement device 10 includes A/D converters 11I and 11Q, an I-signal FFT unit 12I, a Q-signal FFT unit 12Q, an I-signal amplitude/phase deriving unit 14I, a Q-signal amplitude/phase deriving unit 14Q, a carrier amplitude ratio deriving unit 16a, a carrier quadrature error deriving unit 16b, an averaging unit (gain imbalance deriving unit) 18a, and an averaging unit (phase-difference corresponding value deriving unit) 18b.

The A/D converter 11I receives the I signal (analog signal) from the quadrature demodulator 4, converts the I signal into a digital signal, and outputs the digital signal.

The A/D converter 11Q receives the Q signal (analog signal) from the quadrature demodulator 4, converts the Q signal into a digital signal, and outputs the digital signal.

The I-signal FFT unit 12I receives the I signal converted into the digital signal from the A/D converter 11I. Moreover, the I-signal FFT unit 12I transforms the I signal by the FFT, obtains components $FI_1, FI_2, \ldots, FI_N$ for the respective carrier signals of the I signal, and feeds the obtained components to the I-signal amplitude/phase deriving unit 14I. It should be noted that $FI_n$ (n is an integer from 1 to N) is a component of the I signal corresponding to the carrier signal $C_n$.

The Q-signal FFT unit 12Q receives the Q signal converted into the digital signal from the A/D converter 11Q. Moreover, the Q-signal FFT unit 12Q transforms the Q signal by the FFT, obtains components $FQ_1, FQ_2, \ldots, FQ_N$ for the respective carrier signals of the Q signal, and feeds the obtained components to the Q-signal amplitude/phase deriving unit 14Q. It should be noted that $FQ_n$ is a component of the Q signal corresponding to the carrier signal $C_n$.

The I-signal amplitude/phase deriving unit 14I derives an amplitude of the I signal for the respective carrier signals (derived results are denoted by $AI_1, AI_2, \ldots, AI_N$). Moreover, the I-signal amplitude/phase deriving unit 14I derives a phase of the I signal for the respective carrier signals (derived results are denoted by $PI_1, PI_2, \ldots, PI_N$).

The amplitude $AI_n$ of the I signal for the respective carrier signals, and the phase $PI_n$ of the I signal for the respective carrier signals are respectively represented by the following equations (1) and (2).

$$AI_n = ((\text{Re}(FI_n))^2 + (\text{Im}(FI_n))^2)^{1/2} \quad (n = 1, 2, \ldots, N) \tag{1}$$

$$PI_n = \tan^{-1}\left(\frac{\text{Im}(FI_n)}{\text{Re}(FI_n)}\right) \quad (n = 1, 2, \ldots, N) \tag{2}$$

where $\text{Re}(FI_n)$ denotes the real part of $FI_n$, and $\text{Im}(FI_n)$ denotes the imaginary part of $FI_n$.

The Q-signal amplitude/phase deriving unit 14Q derives an amplitude of the Q signal for the respective carrier signals (derived results are denoted by $AQ_1, AQ_2, \ldots, AQ_N$). Moreover, the Q-signal amplitude/phase deriving unit 14Q derives a phase of the Q signal for the respective carrier signals (derived results are denoted by $PQ_1, PQ_2, \ldots, PQ_N$).

The amplitude $AQ_n$ of the Q signal for the respective carrier signals, and the phase $PQ_n$ of the Q signal for the respective carrier signals are respectively represented by the following equations (3) and (4).

$$AQ_n = ((\text{Re}(FQ_n))^2 + (\text{Im}(FQ_n))^2)^{1/2} \quad (n = 1, 2, \ldots, N) \tag{3}$$

$$PQ_n = \tan^{-1}\left(\frac{\text{Im}(FQ_n)}{\text{Re}(FQ_n)}\right) \quad (n = 1, 2, \ldots, N) \tag{4}$$

where $\text{Re}(FQ_n)$ denotes the real part of $FQ_n$, and $\text{Im}(FQ_n)$ denotes the imaginary part of $FQ_n$.

The carrier amplitude ratio deriving unit 16a derives ratios $GB_1, GB_2, \ldots, GB_N$ between the amplitude of the I signal and the amplitude of the Q signal for the respective carrier signals based on the results $AI_1, AI_2, \ldots, AI_N$ derived by the I-signal amplitude/phase deriving unit 14I, and the results $AQ_1, AQ_2, \ldots, AQ_N$ derived by the Q-signal amplitude/phase deriving unit 14Q.

It should be noted that the ratios $GB_1, GB_2, \ldots, GB_N$ between the amplitude of the I signal and the amplitude of the Q signal for the respective carrier signals are represented by the following equation (5).

$$GB_n = AQ_n/AI_n (n=1, 2, \ldots, N) \tag{5}$$

It should be noted that the carrier amplitude ratio deriving unit 16a may have N of units for carrying out the arithmetic operation represented by the equation (5), and the respective units may calculate $GB_n$ (n=1, 2, ..., N). Alternatively, the carrier amplitude ratio deriving unit 16a may have one unit for carrying out the arithmetic operation represented by the equation (5), and may carry out the arithmetic operation represented by the equation (5) N times.

The carrier quadrature error deriving unit 16b derives carrier phase-difference corresponding values corresponding to the difference between the phase of the I signal and the phase of the Q signal for the respective carrier signals based on the results $PI_1, PI_2, \ldots, PI_N$ derived by the I-signal amplitude/phase deriving unit 14I, and the results $PQ_1, PQ_2, \ldots, PQ_N$ derived by the Q-signal amplitude/phase deriving unit 14Q. According to this embodiment, the carrier phase-difference corresponding values are differences $E_1, E_2, \ldots, E_N$ between the difference between the phase of the I signal and the phase of the Q signal, and 90 degrees ($=\pi/2$[rad]), which is the ideal value of the difference in phase, for the respective carrier signals.

It should be noted that $E_1, E_2, \ldots, E_N$ are represented by the following equation (6).

$$E_n = PQ_n - PI_n - \pi/2 (n=1, 2, \ldots, N) \tag{6}$$

It should be noted that the carrier quadrature error deriving unit 16b may have N of units for carrying out the arithmetic operation represented by the equation (6), and the respective units may calculate $E_n$ (n=1, 2, ..., N). Alternatively, the carrier quadrature error deriving unit 16b may have one unit for carrying out the arithmetic operation represented by the equation (6), and may carry out the arithmetic operation represented by the equation (6) N times.

The averaging unit (gain imbalance deriving unit) 18a derives the gain imbalance GB based on the results derived by the carrier amplitude ratio deriving unit 16a. The averaging unit 18a derives the gain imbalance GB by averaging results $GB_1, GB_2, \ldots, GB_N$ derived by the carrier amplitude ratio deriving unit 16a. It should be noted that the gain imbalance GB is represented by the following equation (7).

$$GB = \left(\sum_{n=1}^{N} GB_n\right)/N \tag{7}$$

The averaging unit (phase-difference corresponding value deriving unit) 18b derives the phase-difference corresponding value (specifically, the quadrature error) based on the results derived by the carrier phase-difference corresponding value deriving unit 16b. The averaging unit 18b derives the phase-difference corresponding value (quadrature error E) by averaging results $E_1, E_2, \ldots, E_N$ derived by the carrier phase-difference corresponding value deriving unit 16b. It should be noted that the quadrature error E is represented by the following equation (8).

$$E = \left(\sum_{n=1}^{N} E_n\right) / N \qquad (8)$$

A description will now be given of an operation of the embodiment of the present invention.

Figure 2:
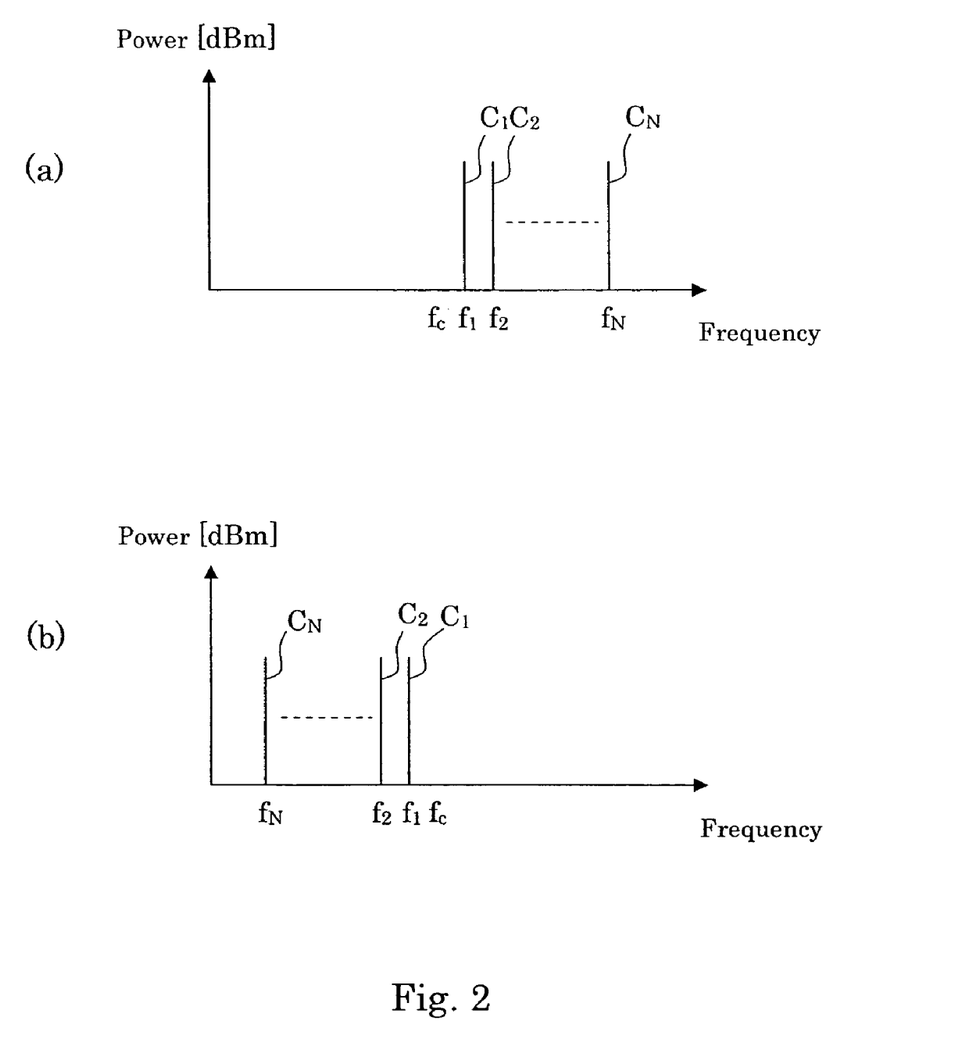
FIGS. 2(a) and 2(b) show frequency spectra of the respective carrier signals contained in the RF signal.
Figure 4:
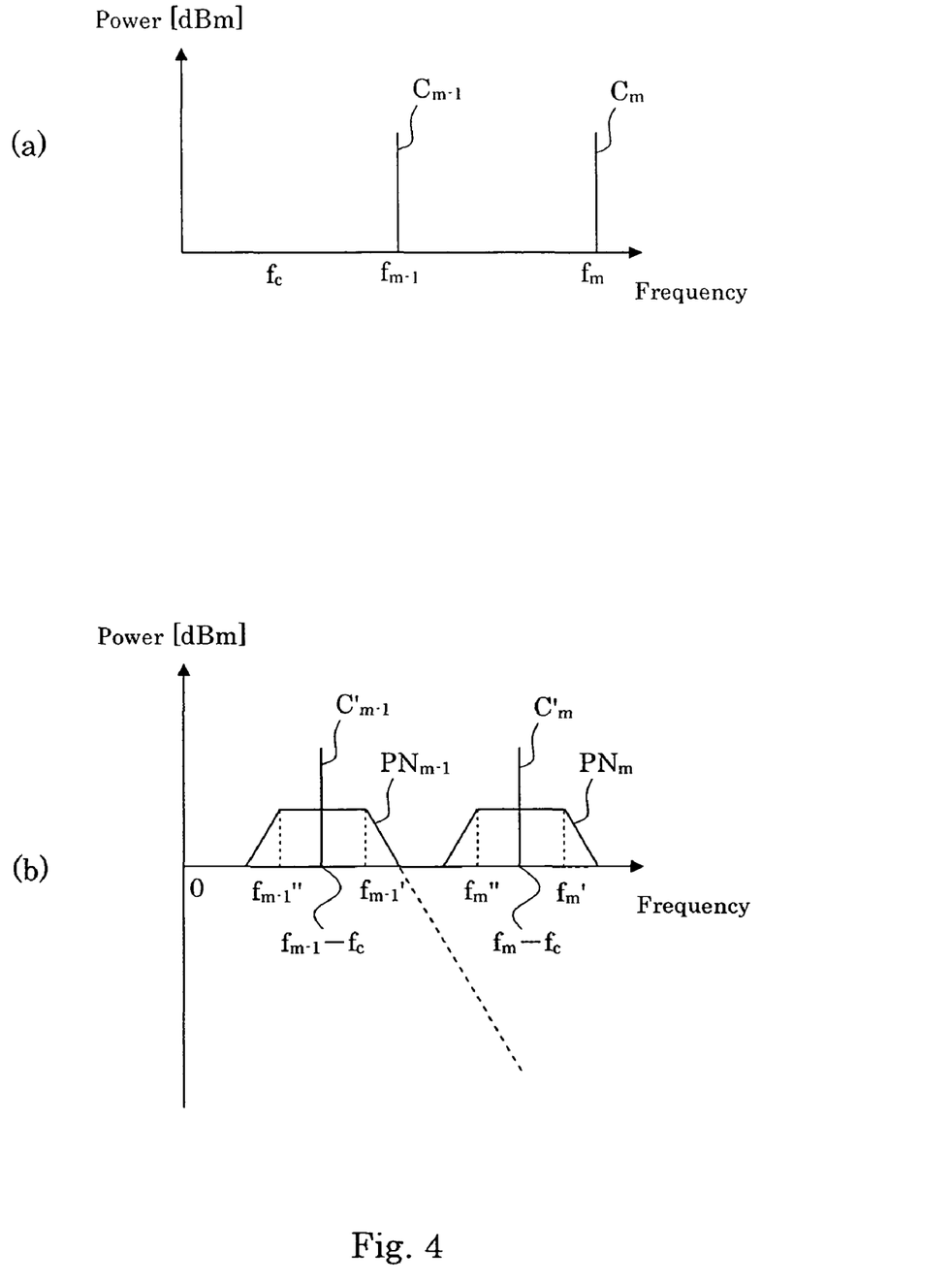
FIG. 4(a) shows a frequency spectrum of one arbitrary carrier signal (arbitrary carrier signal) $C_{m-1}$ and an adjacent carrier signal $C_m$ adjacent to the arbitrary carrier signal $C_{m-1}$.
FIG. 4(b) shows a frequency spectrum of an arbitrary component $C'_{m-1}$ (of the I signal and Q signal) corresponding to the arbitrary carrier signal $C_{m-1}$, a first phase noise $PN_{m-1}$ generated in a neighborhood thereof, an adjacent component $C'_m$ (of the I signal and Q signal) corresponding to the adjacent carrier signal $C_m$, and a second phase noise $PN_m$ generated in a neighborhood thereof.

First, the signal generator 2 outputs the RF signal (signal to be demodulated). The frequency spectrum of the RF signal is arranged such that the frequencies $f_1, f_2, \ldots, f_N$ of all the carrier signals are higher than the frequency $f_c$ of the local signal as shown in FIG. 2(*a*). Moreover, the interval $f_m$-$f_{m-1}$ between an arbitrary carrier signal $C_{m-1}$ and an adjacent carrier signal $C_m$ is set sufficiently wide such that $f_{m-1}'<f_m''$ (refer to FIGS. 4(*a*) and 4(*b*)).

The RF signal is fed to the quadrature demodulator 4. The quadrature demodulator 4 demodulates the RF signal, and outputs the I signal and the Q signal.

The multiplier 41I of the quadrature demodulator 4 multiplies the local signal (frequency $f_c$) and the RF signal by each other. The output from the multiplier 41I passes through the low-pass filter 46I and the amplifier 48I, resulting in the I signal.

The multiplier 41Q of the quadrature demodulator 4 multiplies the orthogonal local signal (orthogonal to the local signal in phase) output from the phase shifter 44 and the RF signal by each other. The output from the multiplier 41Q passes through the low-pass filter 46Q and the amplifier 48Q, resulting in the Q signal.

The I signal and the Q signal output from the quadrature demodulator 4 are fed to the error measurement device 10. The error measurement device 10 measures the gain imbalance and the quadrature error.

The I signal and the Q signal are respectively converted into digital signals by the A/D converters 11I and 11Q, and are fed to the I-signal FFT unit 12I and the Q-signal FFT unit 12Q.

The I-signal FFT unit 12I obtains the components $FI_1, FI_2, \ldots, FI_N$ for the respective carrier signals of the I signal, and feeds the components to the I-signal amplitude/phase deriving unit 14I. The Q-signal FFT unit 12Q obtains the components $FQ_1, FQ_2, \ldots, FQ_N$ for the respective carrier signals of the Q signal, and feeds the components to the Q-signal amplitude/phase deriving unit 14Q.

The I-signal amplitude/phase deriving unit 14I obtains the amplitudes $AI_n$ (refer to the equation (1)) for the respective carrier signals of the I signal, and the phases $PI_n$ (refer to the equation (2)) for the respective carrier signals of the I signal, and feeds them respectively to the carrier amplitude ratio deriving unit 16a and the carrier quadrature error deriving unit 16b.

The Q-signal amplitude/phase deriving unit 14Q obtains the amplitudes $AQ_n$ (refer to the equation (3)) for the respective carrier signals of the Q signal, and the phases $PQ_n$ (refer to the equation (4)) for the respective carrier signals of the Q signal, and feeds them respectively to the carrier amplitude ratio deriving unit 16a and the carrier quadrature error deriving unit 16b.

The carrier amplitude ratio deriving unit 16a derives the ratios $GB_1, GB_2, \ldots, GB_N$ between the amplitude of the I signal and the amplitude of the Q signal for the respective carrier signals (refer to the equation (5)). $GB_1, GB_2, \ldots, GB_N$ are averaged by the averaging unit (gain imbalance deriving unit) 18a (refer to the equation (7)), and the gain imbalance GB is obtained.

The carrier quadrature error deriving unit 16b derives the differences $E_1, E_2, \ldots, E_N$ between the difference between the phase of the I signal and the phase of the Q signal, and 90 degrees ($=\pi/2$[rad]), which is the ideal value of the difference in phase, for the respective carrier signals (refer to the equation (6)). $E_1, E_2, \ldots, E_N$ are averaged by the averaging unit (phase-difference corresponding value deriving unit) 18b (refer to the equation (8)), and the quadrature error E is obtained.

According to the embodiment of the present invention, since the frequencies of the carrier signals take the values from $f_1$ to $f_N$, it is possible to measure the overall gain imbalance GB and quadrature error E in the frequency range from $f_1$ to $f_N$. If the RF signal has a single carrier signal (frequency is $f_x$), the gain imbalance GB and the quadrature error E are to be measured for the frequency $f_x$. In this case, there poses a problem that overall characteristics of the gain imbalance GB and the quadrature error E, which change according to the frequency, are not measured. This problem is solved by the fact that the frequency of the carrier signals takes the values from $f_1$ to $f_N$.

According to the embodiment of the present invention, the gain imbalance GB is obtained by averaging the ratios $GB_1, GB_2, \ldots, GB_N$ between the amplitude of the I signal and the amplitude of the Q signal for the respective carrier signals, and the quadrature error E is obtained by averaging the differences $E_1, E_2, \ldots, E_N$ between the difference between the phase of the I signal and the phase of the Q signal, and 90 degrees, which is the ideal difference, for the respective carrier signals. Thus, it is possible to derive the average gain imbalance GB and the average quadrature error E in the range of the frequency from $f_1$ to $f_N$.

Moreover, it is possible to reduce a variation in the measured values thereby increasing the measurement precisions of the gain imbalance GB and the quadrature error E by taking the averages.

When the RF signal has a single carrier signal, it is necessary to carry out the measurement of the gain imbalance GB and the quadrature error E multiple times, and then to average the measurement results in order to increase the measurement precisions by averaging. There poses a problem that a period required for the measurement increases for carrying out the measurement multiple times. According to the embodiment of the present invention, since there are multiple carrier signals, and the measurement values $GB_1, GB_2, \ldots, GB_N$ ($E_1, E_2, \ldots, E_N$) are averaged, it is only necessary to carry out the measurement once, and it is thus possible to reduce the measurement period compared with that for carrying out the measurement multiple times.

According to the embodiment of the present invention, since the I signal and the Q signal are transformed according to the FFT respectively by the I-signal FFT unit 12I and the Q-signal FFT unit 12Q, it is possible to remove the phase noise from the I signal and the Q signal. The phase noise can be removed by the FFT faster than by filtering in the time domain (by convolution).

According to the embodiment of the present invention, since the frequencies of all the carrier signals are higher (or lower) than $f_c$, it is possible to prevent the components of different carrier signals from overlapping each other as a result of the FFT of the I signal and the Q signal.

According to the embodiment of the present invention, the interval $f_m$-$f_{m-1}$ between an arbitrary carrier signal $C_{m-1}$ and an adjacent carrier signal $C_m$ is set such that the first phase noise $PN_{m-1}$ is smaller than the second phase noise $PN_m$ in the neighborhood of the adjacent component $C'_m$ ranging from $f_m''$ to $f_m'$. It is thus possible to reduce influence of the phase noise on the measurement of the gain imbalance GB and the quadrature error E.

Moreover, the above-described embodiment may be realized in the following manner. A computer is provided with a CPU, a hard disk, and a media (such as a floppy disk (registered trade mark) and a CD-ROM) reader, and the media reader is caused to read a medium recording a program realizing the above-described respective components (such as the I-signal FFT unit 12I, the Q-signal FFT unit 12Q, the I-signal amplitude/phase deriving unit 14I, the Q-signal amplitude/phase deriving unit 14Q, the carrier amplitude ratio deriving unit 16a, the carrier quadrature error deriving unit 16b, the averaging unit (gain imbalance deriving unit) 18a, and the averaging unit (phase-difference corresponding value deriving unit) 18b), thereby installing the program on the hard disk. This method may also realize the above-described functions.

The invention claimed is:

1. A gain imbalance measurement device which receives an I signal and a Q signal from a quadrature demodulator for demodulating a signal to be demodulated, the signal including a plurality of carrier signals respectively different from each other in frequency, and which measures a gain imbalance, the gain imbalance measurement device comprising:
    an I-signal amplitude deriver that derives a plurality of first amplitudes of the I signal, each corresponding to one of the plurality of carrier signals;
    a Q-signal amplitude deriver that derives a plurality of second amplitudes of the Q signal, each corresponding to one of the plurality of carrier signals;
    a carrier amplitude ratio deriver that derives a plurality of ratios between respective ones of the plurality of first amplitudes of the I signal and the plurality of second amplitudes of the Q signal, each corresponding to one of the plurality of carrier signals; and
    a gain imbalance deriver that derives the gain imbalance based on all of the plurality of ratios derived by the carrier amplitude ratio deriver.

2. The gain imbalance measurement device according to claim 1, wherein the gain imbalance deriver obtains the gain imbalance by averaging the plurality of ratios derived by the carrier amplitude ratio deriver.

3. The gain imbalance measurement device according to claim 1, comprising:
    an I-signal FFT transformer that transforms the I signal by a fast fourier transform, thereby obtaining a first component of the I signal for each of the plurality of carrier signals, and feeds the first component to the I-signal amplitude deriver; and
    a Q-signal FFT transformer that transforms the Q signal by the fast fourier transform, thereby obtaining a second component of the Q signal for each of the plurality of carrier signals, and feeds the second component to the Q-signal amplitude deriver.

4. The gain imbalance measurement device according to claim 3, wherein
    the quadrature demodulator comprises:
        a local signal source that outputs a local signal; and
        a multiplier that multiplies the signal to be demodulated by one of the local signal and an orthogonal local signal orthogonal in phase to the local signal, and
    frequencies of the plurality of carrier signals are one of higher than a frequency of the local signal and lower than the frequency of the local signal.

5. The gain imbalance measurement device according to claim 1, wherein an interval between an arbitrary carrier signal of the plurality of carrier signals and an adjacent carrier signal of the plurality carrier signals which is adjacent to the arbitrary carrier signal is set such that a first phase noise generated at a first frequency adjacent to a second frequency of a first arbitrary component of the I signal and the Q signal corresponding to the arbitrary carrier signal is smaller than a second phase noise generated at a third frequency adjacent to a fourth frequency of a second adjacent component of the I signal and the Q signal corresponding to the adjacent carrier signal.

6. A phase-difference correspondence value measurement device which receives an I signal and a Q signal from a quadrature demodulator for demodulating a signal to be demodulated, the signal including a plurality of carrier signals respectively different from each other in frequency, and which measures a phase-difference correspondence value, the phase-difference correspondence value measurement device comprising:
    an I-signal phase deriver that derives a plurality of first phases of the I signal, each corresponding to one of the plurality of carrier signals;
    a Q-signal phase deriver that derives a plurality of second phases of the Q signal, each corresponding to one of the plurality of carrier signals;
    a carrier phase-difference corresponding value deriver that derives a plurality of carrier phase-difference corresponding values corresponding to a difference between respective ones of the plurality of first phases of the I signal and the plurality of second phases of the Q signal, each corresponding to one of the plurality of carrier signals; and
    a phase-difference corresponding value deriver that derives the phase-difference corresponding value based on all of the plurality of carrier phase-difference corresponding values derived by the carrier phase-difference corresponding value deriver.

7. The phase-difference corresponding value measurement device according to claim 6, wherein the phase-difference corresponding value deriver obtains the phase-difference corresponding value by averaging the plurality of carrier phase-difference corresponding values derived by the carrier phase-difference corresponding value deriver.

8. The phase-difference corresponding value measurement device according to claim 6, comprising:
    an I-signal FFT transformer that transforms the I signal by a fast fourier transform, thereby obtaining a first component of the I signal for each of the plurality of carrier signals, and feeds the first component to the I-signal phase deriver; and
    a Q-signal FFT transformer that transforms the Q signal by the fast fourier transform, thereby obtaining a second component of the Q signal for each of the plurality of carrier signals, and feeds the component to the Q-signal phase deriver.

9. The phase-difference corresponding value measurement device according to claim 8, wherein
    the quadrature demodulator comprises:
        a local signal source that outputs a local signal; and
        a multiplier that multiplies the signal to be demodulated by one of the local signal and an orthogonal local signal orthogonal in phase to the local signal, and
    frequencies of the plurality of carrier signals are one of higher than a frequency of the local signal and lower than the frequency of the local signal.

10. The phase-difference corresponding value measurement device according to claim 6, wherein an interval between an arbitrary carrier signal of the plurality of carrier signals and an adjacent carrier signal of the plurality of carrier signals which is adjacent to the arbitrary carrier signal is set such that a first phase noise generated at a first frequency adjacent to a second frequency of a first arbitrary component of the I signal and the Q signal corresponding to the arbitrary carrier signal is smaller than a second phase noise generated at a third frequency adjacent to a fourth frequency of a second adjacent component of the I signal and the Q signal corresponding to the adjacent carrier signal.

11. The phase-difference corresponding value measurement device according to claim 6, wherein
the phase-difference corresponding value is a difference between a difference between phases of the I signal and the Q signal, and 90 degrees, and
the plurality of carrier phase-difference corresponding values is a difference between the difference between the respective ones of the first plurality of phases of the I signal and the second plurality of phases of the Q signal, and 90 degrees, each corresponding to one of the plurality of carrier signals.

12. A gain imbalance measurement method of receiving an I signal and a Q signal from a quadrature demodulator for demodulating a signal to be demodulated, the signal including a plurality of carrier signals respectively different from each other in frequency, and measuring a gain imbalance, the gain imbalance measurement method comprising:
deriving a plurality of first amplitudes of the I signal, each corresponding to one of the plurality of carrier signals;
deriving a plurality of second amplitudes of the Q signal, each corresponding to one of the plurality of carrier signals;
deriving a plurality of ratios between respective ones of the plurality of first amplitudes of the I signal and the plurality of second amplitudes of the Q signal, each corresponding to one of the plurality of carrier signals; and
deriving the gain imbalance based on all of the plurality of ratios.

13. A phase-difference correspondence value measurement method of receiving an I signal and a Q signal from a quadrature demodulator for demodulating a signal to be demodulated, the signal including a plurality of carrier signals respectively different from each other in frequency, and measuring a phase-difference correspondence value, the phase-difference correspondence value measurement method comprising:
deriving a plurality of first phases of the I signal, each corresponding to one of the plurality of carrier signals;
deriving a plurality of second phases of the Q signal, each corresponding to one of the plurality of carrier signals;
deriving a plurality of carrier phase-difference corresponding values corresponding to a difference between respective ones of the plurality of first phases of the I signal and the plurality of second phases of the Q signal, each corresponding to one of the plurality of carrier signals; and
deriving the phase-difference corresponding value based on all of the plurality of carrier phase-difference corresponding values.

14. A program of instructions embodied on a non-transitory computer-readable medium for execution by a computer to perform a gain imbalance measurement process for receiving an I signal and a Q signal from a quadrature demodulator for demodulating a signal to be demodulated, the signal including a plurality of carrier signals respectively different from each other in frequency, and for measuring a gain imbalance, said gain imbalance measurement process comprising:
deriving a plurality of first amplitudes of the I signal, each corresponding to one of the plurality of carrier signals;
deriving a plurality of second amplitudes of the Q signal, each corresponding to one of the plurality of carrier signals;
deriving a plurality of ratios between respective ones of the plurality of first amplitudes of the I signal and the plurality of second amplitudes of the Q signal, each corresponding to one of the plurality of carrier signals; and
deriving the gain imbalance based on all of the plurality of ratios.

15. A program of instructions embodied on a non-transitory computer-readable medium for execution by a computer to perform a phase-difference correspondence value measurement process for receiving an I signal and a Q signal from a quadrature demodulator for demodulating a signal to be demodulated, the signal including a plurality of carrier signals respectively different from each other in frequency, and for measuring a phase-difference correspondence value, said phase-difference correspondence value measurement process comprising:
deriving a plurality of first phases of the I signal, each corresponding to one of the plurality of carrier signals;
deriving a plurality of second phases of the Q signal, each corresponding of the plurality of carrier signals;
deriving a plurality of carrier phase-difference corresponding values corresponding to a difference between respective ones of the plurality of first phases of the I signal and the plurality of second phases of the Q signal, each corresponding to one of the plurality of carrier signals; and
deriving the phase-difference corresponding value based on all of the plurality of carrier phase-difference corresponding values.

16. A non-transitory computer-readable medium having a program of instructions for execution by the computer to perform a gain imbalance measurement process for receiving an I signal and a Q signal from a quadrature demodulator for demodulating a signal to be demodulated, the signal including a plurality of carrier signals respectively different from each other in frequency, and for measuring a gain imbalance, said gain imbalance measurement process comprising:
deriving a plurality of first amplitudes of the I signal, each corresponding to one of the plurality of carrier signals;
deriving a plurality of second amplitudes of the Q signal, each corresponding to one of the plurality of carrier signals;
deriving a plurality of ratios between respective ones of the plurality of first amplitudes of the I signal and the plurality of second amplitudes of the Q signal, each corresponding to one of the plurality of carrier signals; and
deriving the gain imbalance based on all of the plurality of ratios.

17. A non-transitory computer-readable medium having a program of instructions for execution by the computer to perform a phase-difference correspondence value measurement process for receiving an I signal and a Q signal from a quadrature demodulator for demodulating a signal to be demodulated, the signal including a plurality of carrier signals respectively different from each other in frequency, and for measuring a phase-difference correspondence value, said phase-difference correspondence value measurement process comprising:

deriving a plurality of first phases of the I signal, each corresponding to one of the plurality of carrier signals;

deriving a plurality of second phases of the Q signal, each corresponding to one of the plurality of carrier signals;

deriving a plurality of carrier phase-difference corresponding values corresponding to a difference between respective ones of the plurality of first phases of the I signal and the plurality of second phases of the Q signal, each corresponding to one of the plurality of carrier signals; and deriving the phase-difference corresponding value based on all of the plurality of carrier phase-difference corresponding values.

* * * * *